United States Patent
Madonna et al.

(10) Patent No.: US 11,621,580 B2
(45) Date of Patent: Apr. 4, 2023

(54) MICROGRID SWITCHOVER USING ZERO-CROSS DETECTION

(71) Applicant: Savant Systems, Inc., Hyannis, MA (US)

(72) Inventors: Robert P. Madonna, Osterville, MA (US); Wilson D. Callan, Swansea, MA (US); Jon R. Magnussen, Barrington, RI (US); Siegmar K. Eschholz, Southwest Harbor, ME (US)

(73) Assignee: Savant Systems, Inc., Hyannis, MA (US)

( * ) Notice: Subject to any disclaimer, the term of this patent is extended or adjusted under 35 U.S.C. 154(b) by 0 days.

(21) Appl. No.: 17/463,143

(22) Filed: Aug. 31, 2021

(65) Prior Publication Data

US 2023/0063466 A1     Mar. 2, 2023

(51) Int. Cl.
  *H02J 9/00* (2006.01)
  *H02J 3/00* (2006.01)
  *H02J 9/06* (2006.01)

(52) U.S. Cl.
  CPC .............. *H02J 9/062* (2013.01); *H02J 3/001* (2020.01)

(58) Field of Classification Search
  CPC .................................. H02J 9/062; H02J 3/001
  See application file for complete search history.

(56) References Cited

U.S. PATENT DOCUMENTS

| | | |
|---|---|---|
| 4,001,646 A | 1/1977 | Howell |
| 5,185,705 A | 2/1993 | Farrington |
| 7,043,380 B2 | 5/2006 | Rodenberg, III |
| 9,105,180 B2 | 8/2015 | McKinley et al. |

(Continued)

FOREIGN PATENT DOCUMENTS

| | | |
|---|---|---|
| CA | 2353667 A1 | 2/2002 |
| CN | 102084569 A | 6/2011 |

(Continued)

OTHER PUBLICATIONS

PCT Notification of Transmittal of the International Search Report and the Written Opinion of the International Searching Authority, or the Declaration, International Searching Authority, International Application No. PCT/US2022/032286, dated Jun. 5, 2022, 13 pages.
PCT Notification of Transmittal of the International Search Report and the Written Opinion of the International Searching Authority, or the Declaration, International Searching Authority, International Application No. PCT/US2022/032699, dated Jun. 8, 2022, 15 pages.

(Continued)

*Primary Examiner* — Toan T Vu
(74) *Attorney, Agent, or Firm* — Cesari and McKenna, LLP

(57) ABSTRACT

A technique enables microgrid switchover using zero cross detection. A flexible load management system includes a virtual critical load panel (vCLP) that utilizes circuit breakers in combination with companion modules configured to sense power provided to one or more loads to identify zero-crossings. When a preconfigured number of consecutive, missed zero-crossings is detected, the companion module is alerted as to potential main power loss and transitions to a virtual critical load (vCL) mode for load adjustment prior to operation under local power. Upon detection of main power loss, the companion module is configured for load activation (or deactivation) via states of one or more vCL bits that configure each load for either ON or OFF state when operating under local power.

20 Claims, 2 Drawing Sheets

(56) References Cited

U.S. PATENT DOCUMENTS

| | | |
|---|---|---|
| 2004/0075343 A1 | 4/2004 | Wareham et al. |
| 2004/0163073 A1 | 8/2004 | Krzyzanowski et al. |
| 2005/0102544 A1 | 5/2005 | Brewer |
| 2005/0216131 A1 | 9/2005 | Sodemann et al. |
| 2007/0222295 A1 | 9/2007 | Wareham et al. |
| 2010/0152910 A1 | 6/2010 | Taft |
| 2010/0161146 A1 | 6/2010 | Boss et al. |
| 2010/0314940 A1 | 12/2010 | Palmer et al. |
| 2011/0210712 A1 | 9/2011 | Tagare |
| 2011/0313587 A1 | 12/2011 | Lin |
| 2012/0239218 A1 | 9/2012 | Forbes, Jr. |
| 2012/0324271 A1 | 12/2012 | Nigam et al. |
| 2014/0067144 A1 | 3/2014 | Chen et al. |
| 2014/0088780 A1 | 3/2014 | Chen |
| 2014/0139023 A1 | 5/2014 | Hwang et al. |
| 2014/0277800 A1 | 9/2014 | Hughes |
| 2014/0379161 A1 | 12/2014 | Busser |
| 2015/0012145 A1 | 1/2015 | Kiko |
| 2015/0042286 A1 | 2/2015 | Lu et al. |
| 2015/0214759 A1 | 7/2015 | Wootton et al. |
| 2015/0214768 A1 | 7/2015 | Matsuyama et al. |
| 2015/0256665 A1 | 9/2015 | Pera et al. |
| 2015/0276253 A1 | 10/2015 | Montalvo |
| 2015/0280436 A1 | 10/2015 | Weckx et al. |
| 2016/0226235 A1 | 8/2016 | Lathrop et al. |
| 2016/0350778 A1 | 12/2016 | Levine et al. |
| 2016/0358722 A1 | 12/2016 | Lakshmanan et al. |
| 2016/0363949 A1 | 12/2016 | Zimmanck |
| 2017/0140602 A1 | 5/2017 | Curt |
| 2017/0236676 A1 | 8/2017 | Bartonek |
| 2017/0288599 A1 | 10/2017 | Chapman et al. |
| 2018/0075548 A1* | 3/2018 | Madonna ........... G06Q 30/0283 |
| 2018/0082816 A1 | 3/2018 | Herrmann |
| 2018/0299160 A1 | 10/2018 | Inuga et al. |
| 2018/0342870 A1 | 11/2018 | Zeng et al. |
| 2019/0261493 A1 | 8/2019 | Dolan et al. |

FOREIGN PATENT DOCUMENTS

| | | |
|---|---|---|
| CN | 204230176 U | 3/2015 |
| CN | 104537505 | 4/2015 |
| CN | 105848389 A | 8/2016 |
| JP | 2002-95152 A | 3/2002 |
| JP | 2003111311 A | 4/2003 |
| JP | 2005110218 A | 4/2005 |
| JP | 2008310972 A | 12/2008 |
| JP | 2009-507340 A | 2/2009 |
| JP | 2010-537622 A | 12/2010 |
| JP | 2011-120323 A | 6/2011 |
| JP | 201222706 A | 2/2012 |
| JP | 2012511300 A | 5/2012 |
| JP | 2012-514963 A | 6/2012 |
| JP | 2012-235615 A | 11/2012 |
| JP | 2014003726 A | 1/2014 |
| JP | 2015-215879 A | 12/2015 |
| JP | 2016-134939 A | 7/2016 |
| JP | 2016-158479 A | 9/2016 |
| KR | 1014404920000 | 9/2014 |
| WO | WO-2004023624 A1 | 3/2004 |
| WO | WO-2005065148 A2 | 7/2005 |
| WO | WO-2007027063 A1 | 3/2007 |
| WO | WO-2010065197 A2 | 6/2010 |
| WO | WO-2011073020 A2 | 6/2011 |
| WO | WO-2015134987 A1 | 9/2015 |
| WO | WO-2016036419 A | 3/2016 |

OTHER PUBLICATIONS

Demeo, Anna, et al. "Community smart grid utilizing dynamic demand response and tidal power for grid stabilization." *Smart Grid and Renewable Energy* 4.07 (2013): 465-472.

EP Office Action dated Jun. 7, 2021, EP Application No. 17 777 715.8-1202, 4 pages.

Husen et al. "Lighting Systems Control for Demand Response," IEEE 2011, 6 pages.

Kempton, Willett et al. "Vehicle-to-grid power implementation: From stabilizing the grid to supporting large-scale renewable energy." *Journal of power sources* 144.1 (2005): 280-294.

Park, Sung Min. "Control and Integration Strategies for Bidirectional and Unidirectional Converters in Residential Distributed Power Systems." (2015).

PCT Notification of Transmittal of the International Search Report and the Written Opinion of the International Searching Authority, or the Declaration, International Searching Authority, International Application No. PCT/US2017/051808, dated May 14, 2018, 24 pages.

PCT Invitation to Pay Additional Fees and, Where Applicable, Protest Fee, International Application No. PCT/US2017/051808, dated Dec. 1, 2017, 14 pages.

\* cited by examiner

MICROGRID SWITCHOVER USING ZERO-CROSS DETECTION

CROSS-REFERENCE TO RELATED APPLICATIONS

The present application is related to U.S. Pat. No. 10,956,992 entitled SYSTEM AND METHODS FOR CREATING DYNAMIC NANO GRIDS AND FOR AGGREGATING ELECTRIC POWER CONSUMERS TO PARTICIPATE IN ENERGY MARKETS, issued on Mar. 23, 2021, and from commonly owned U.S. patent application Ser. No. 17/343,122, entitled FLEXIBLE LOAD MANAGEMENT SYSTEM filed on Jun. 9, 2021, which patent and applications are hereby incorporated by reference.

BACKGROUND

Technical Field

The present disclosure relates generally to the field of electric power and, more specifically, to a system and technique for flexibly managing electric power consumption of loads in a premises.

Background Information

Power system sources, such as generators and microgrids, are often commercially locally deployed by customers or users of premises in a variety of types and sizes. The total power capacity of the local power source, such as a generator or battery, is likely less (smaller) than the amount of power (energy) that a premises, such as a home or place of business, may consume. Therefore, during a switchover of power from a public utility to the local power source (e.g., a microgrid) there is a need to prevent an overload of the local power source while minimizing a power outage during the switchover. However, existing load management solutions typically disconnect the entire microgrid to enable load shedding adjustments in a fixed panel configuration to avoid overload when eventually switching to the local power source.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
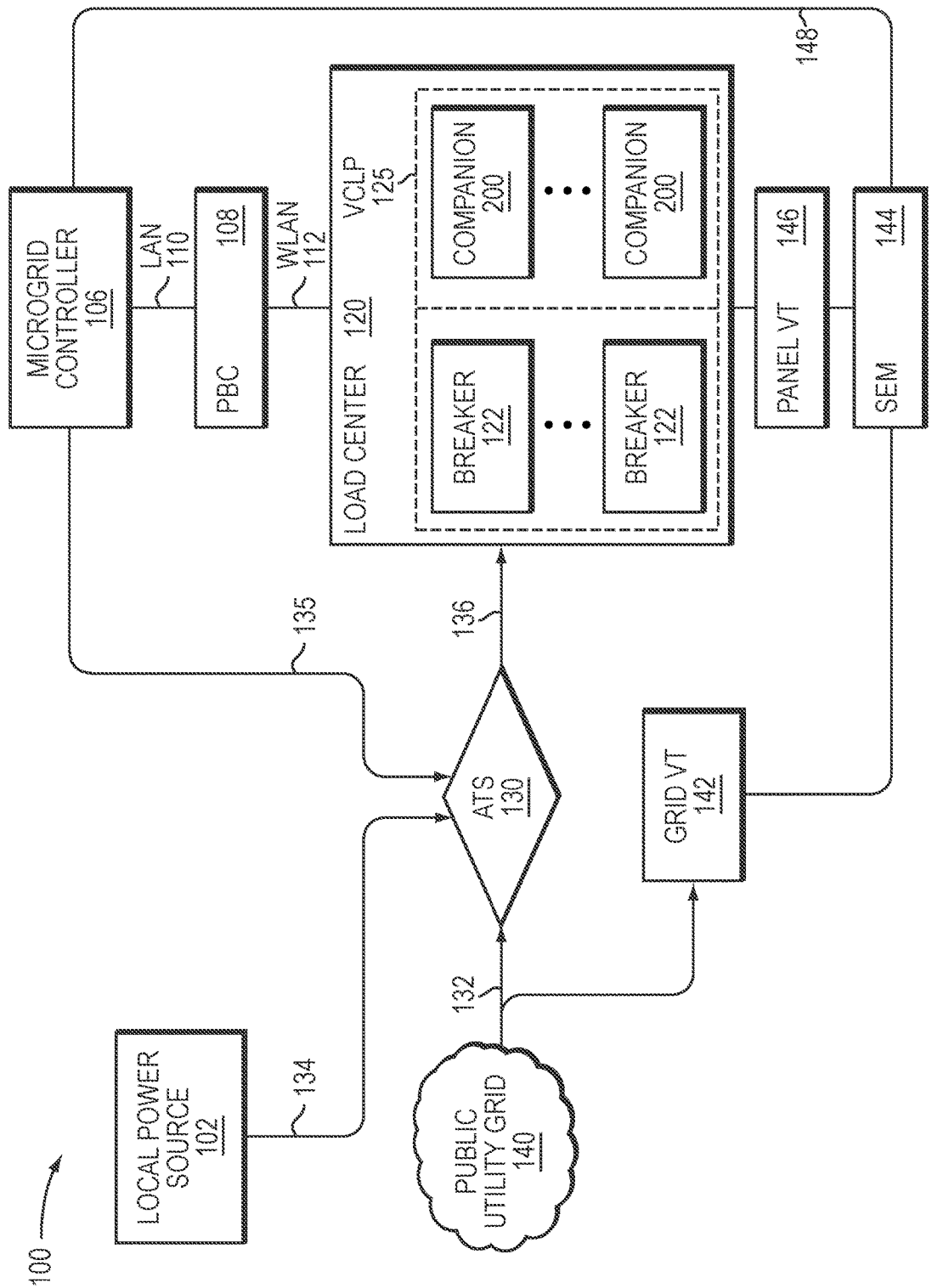
FIG. 1 illustrates an exemplary deployment of a flexible load management (FLM) system within a premises.

The embodiments described herein are directed to a technique for microgrid switchover using zero cross detection that prevents overload when eventually switching to a secondary (local) power source while reducing a power outage during the switchover thereby obviating reliance on a separate controller to direct the microgrid or need for a UPS. A flexible load management (FLM) system includes a virtual critical load panel (vCLP) that utilizes circuit breakers in combination with companion modules (i.e., intelligent controllers) for each branch circuit, wherein the companion modules are configured to sense power provided to one or more loads to identify zero-crossings. When a preconfigured number of consecutive, missed zero-crossings is detected, each companion module is alerted as to potential main power loss (e.g., unstable power from public utility grid) and thus transitions to a virtual critical load (vCL) mode for load adjustment prior to operation under the local power. That is, a controller of the companion module configured to control power to each branch circuit separately detects the number of missed zero-crossings indicating a loss of utility power and, accordingly, transitions to a virtual critical load mode, which immediately adjusts for a reduced power to avoid overload of the local source. Upon detection of main power loss, the companion module is configured for load activation (or deactivation) via states of one or more vCL bits that configure each load for either ON or OFF state when operating under local power. Advantageously, the vCL bits of the technique obviate the need for a panel bridge controller (PBC) to instruct (e.g., via message exchange) the companion module to switch (turn on/off) loads in response to main power loss, thereby eliminating time (e.g., seconds) consumed by the message exchange which may result in downtime of the load, because the local power source may be overloaded causing its breaker to trip. Further, a time for the number of missed zero-crossings to occur may be contemporaneous with a transfer time of power supplied from the main power source to power supplied from the local power source so that a downtime is greatly reduced.

In an embodiment, the vCLP is a prioritized enumeration (i.e., prioritization) of the loads within the premises, wherein the loads are considered sufficiently important such that they are protected by the local power source. According to the technique, the PBC initially configures (sets) states of the vCL bits and sends the configured vCL bits to the companion modules. The vCLP is thereafter dynamically configurable by a user in real time using the vCL bits. Main power loss may be detected by the companion modules based on consecutive missed zero-crossings. A default number of consecutive, missed zero-crossings may be configured at four (4), although any number of consecutive, missed zero-crossings may be preconfigured. For example, upon detection of 4 consecutive, missed zero-crossings, the companion module may transition to vCL mode and, based on the states of the vCL bits associated with the loads, either activate (maintain) or deactivate (shed) power to each load prior to operation under local power. As such, the local power may be overloaded causing its breaker to trip, thus requiring manual intervention to disconnect extra load(s) (i.e., reduce the overload condition) and reset the local power breaker. In addition, the PBC may re-configure the vCL bits of any companion module that loses its state after main power interruption.

DESCRIPTION

FIG. 1 illustrates an exemplary deployment of a flexible load management (FLM) system 100 within a premises, such as a place of business or home. The FLM system 100 employs one or more virtual critical load panels (vCLPs), each of which provides a prioritization of the loads that are considered sufficiently important to warrant protection by a secondary (local) power source 102 of the premises as a failover and/or to supplement power availability. As described herein, the FLM system 100 utilizes circuit interrupts or breakers 122 in combination with companion modules 200 (i.e., intelligent controllers) to vary the prioritization of loads within the premises by time of day, season or even dynamically.

In one or more embodiments, the local power source 102 for the premises may be a generator or battery inverter, the latter of which converts direct current (DC) from a battery to alternating current (AC) of high voltage. However, in an illustrative embodiment, the local power source 102 may be a microgrid configured to generate substantial power, e.g., in a range of 5 kilowatts (kW) to 30 kW, that is sufficient to power numerous and different types of loads.

A microgrid controller 106 is configured to manage power consumption and/or other high-level control functions in the FLM 100, e.g., determining which loads shall be activated (powered). To that end, the microgrid controller 106 may include a processor configured to execute software and manipulate data structures maintained in a memory (e.g., a persistent or volatile memory) having locations for storing the software and the data structures. The data structures may include a state center, which may utilize states of components/devices in the FLM system 100 to describe the configuration of the components/devices, as well as to maintain other types of information. The microgrid controller 106 may also include interfaces containing mechanical, electrical and signaling circuitry needed to connect and communicate with those components/devices. In an embodiment, the microgrid controller 106 may be implemented based on a microgrid controller commercially available from Savant Systems, LLC.

A panel bridge controller (PBC) 108 connects to the microgrid controller 106 via a local area network (LAN) 110, such as Ethernet. The PBC 108 is configured to convert commands received over the LAN 110 from the microgrid controller 106 to messages provided to a load center 120 over a wireless LAN (WLAN) 112 in accordance with a wireless messaging protocol, such as Bluetooth. The commands received over the LAN 110 and WLAN 112 from the microgrid controller 106 are configured to control the companion modules 200 of a load center 120. As described further herein, a companion module 200 monitors (senses) voltage and current (power) of a load and wirelessly communicates (via Bluetooth) to a PBC 108 to enable remote control of the companion module from a mobile application (e.g., executing on a mobile device of a user).

The load center 120 may include one or more electrical panels that, during normal operation, is provided with, e.g., 200 ampere (amp) service from a public utility grid 140. In an embodiment, the load center 120 is configured to receive power over power feed 136 from the grid 140 via a main power feed 132 and an automatic transfer switch (ATS) 130 (having a transfer time to switch to power supplied from the local power source), and distribute the power (i.e., current) to branch circuits of the premises via the circuit breaker 122 enclosed in the electrical panel. Illustratively, the electrical panel is embodied as a vCLP 125 by the inclusion of companion modules 200 hardwired (e.g., in series) with the circuit breakers 122 to control activation/deactivation of a respective circuit breaker. The companion modules 200 and associated circuit breakers 122 may be located in separate electrical boxes (e.g., a main electrical panel and a companion module panel) within the load center 120.

In an embodiment, the ATS 130 is an intelligent power switching device having a microprocessor-based controller configured to automatically disconnect from the main power feed 132 of the public utility grid 140 and connect to a local power feed 134 of the local power source 102 when power from the public utility grid 140 goes down (i.e., power fails or becomes unavailable). Illustratively, the ATS 130 includes a low voltage control 135 in communication with the microgrid controller that is configured to initiate (trigger) starting of the local power source 102 in the absence of power from the public utility grid 140. When power from the public utility grid 140 subsides (terminates), the microgrid controller signals the ATS via control 135 to start the local power source 102 during a transfer time (not shown). Power is then provided over the local power feed 134, through the ATS 130 and over the power feed 136 to the load center 120.

A grid voltage transformer (VT) 142 is configured to monitor the public utility grid voltage (e.g., via a voltage monitoring branch circuit) to determine when the voltage sufficiently subsides (e.g., near a zero-crossing) so that it is safe to turn-on (activate) the local power source 102. In an embodiment, the grid VT 142 converts and isolates utility line voltage, e.g., 240V, to a low voltage suitable for digital sampling. A panel VT 146 is a voltage transformer configured to monitor voltage provided to the load center 120. In an embodiment, the FLM system 100 may also include one or more current transformers (CTs) configured to monitor current from the public utility grid 140 that is provided to the load center 120.

A smart energy monitor (SEM) 144 is configured to monitor (measure) the voltages and currents from the transformers, as well as from other loads (such as air conditioners) in the premises. Illustratively, the SEM 144 is embodied as an analog-to-digital (A-D) converter that collects and samples the voltages/currents from the VTs/CTs. The voltages and currents are preferably sampled at a high data rate (e.g., 1 kHz) by the SEM 144, which performs operations (i.e., computations) directed to, e.g., power factor, apparent/real power, etc., for power management calculations. The sampled data is then provided to the microgrid controller 106 over control and data signal lines 148 to determine a power capacity level of the FLM system, in accordance with the embodiments described herein.

Figure 2:
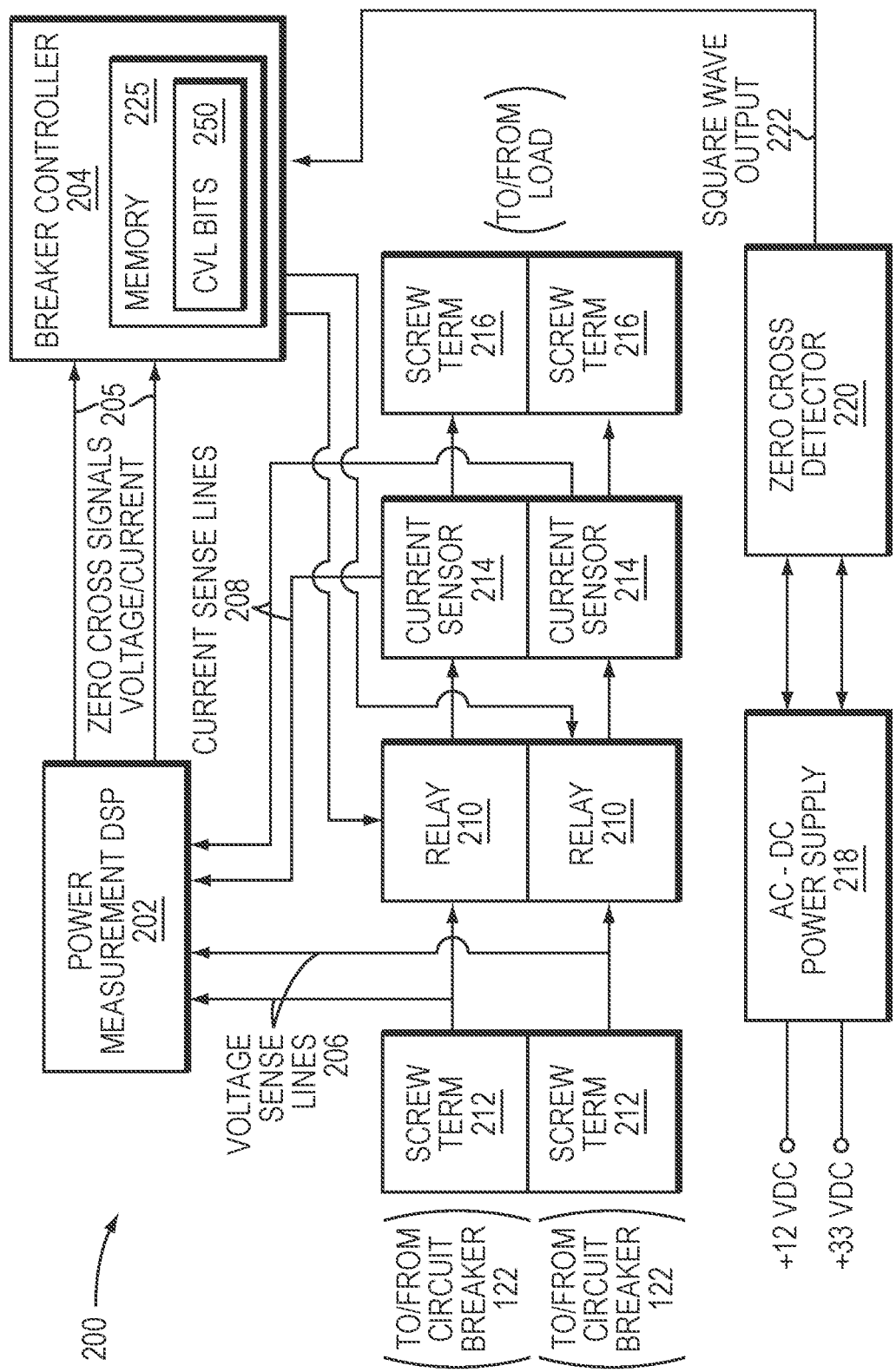
FIG. 2 is a block diagram of a companion module of the FLM system.

FIG. 2 is a block diagram of a companion module 200. In an embodiment, the companion module operates to support, e.g., turn on (and off), one or more relays, e.g., one 30A/240 VAC circuit or, illustratively, two 15A/120 VAC circuits. A power measurement digital signal processor (DSP) 202 is coupled to a breaker controller 204 having a processor with onboard wireless (Bluetooth®) transceiver. The power measurement DSP 202 is also coupled to voltage sense lines 206 and current sense lines 208. As described further herein, the breaker controller 204 also includes a memory 225 (e.g., RAM and/or Flash) adapted to store virtual critical load (vCL) bits 250 configurable by PBC 108.

A pair of relays 210 is coupled, respectively, between a pair of screw terminals 212 and a pair of current (e.g., Hall Effect) sensors 214. The relays 210 are normally-open (NO) to conduct power to a branch circuit and are coupled to each of the pair of screw terminals 212 serves as a connection point to a conventional 15A/120 VAC circuit breaker 122, such as an arc fault breaker, which is manually capable of being actuated. Alternatively, each relay 210 may be embodied as an actuated mechanical switch to obviate the need of the conventional circuit breaker while providing for adequate safety. Each of a pair of screw terminals 216 serves as a connection point to a desired load (not shown). An AC-to-DC power supply 218 outputs +12 VDC and +3.3 VDC to power the companion module 200. As an alternative to using power measurement DSP 202 to output pulses when the sensed voltage and current are near zero, a zero cross detector circuit 220 may be used to generate a square wave output signal which is coupled to the breaker controller 204 over line 222.

In an embodiment, power measurement DSP 202 is capable of calculating, among other values, instantaneous power consumption separately for each load connected to screw terminals 216, as well as average power consumption over a specified period of time, and peak power consumption. Power measurement DSP 202 may also be configured to output pulses over lines 205 to breaker controller 204 when the current and voltage are near zero. By knowing when zero crossings of current and voltage are occurring, breaker controller 204 ensures that relays 210 are only switched (i.e., opened or closed) contemporaneously with the occurrence of one or more zero crossings. This advantageously reduces arcing and tends to prolong the service lives of relays 210.

Operationally, the companion modules 200 are configured to turn on (and off) loads to ensure a proper amount of power for the loads in the premises that is supportable by a local power source 102 (e.g., a microgrid) according to the prioritization of the loads provided by vCLP. In other words, the companion modules 200 are virtually wired (and commanded) to turn on and off (activate/deactivate) based on prioritization. Notably, the companion modules of the vCLP 125 may be configured by a user via a mobile application executing on a mobile device (not shown). After installation by an electrician, the mobile application can be invoked to configure a "bucket" of virtual critical loads (vCLs) supportable by the local power source 102 until a limit of supportable loads is reached. To change (i.e., add) loads to the vCL bucket, the user needs to remove other loads from the bucket. This allows the user to change critical loads via the mobile application, which is an improvement from previous critical load panel approaches that hardwired the critical loads, which hardwired loads could not be easily changed.

However, previous deployments of companion modules 200 included back-up power provided by an uninterrupted power supply (UPS) unit to power the companion modules when the public utility grid fails. When power was lost, load shedding adjustments by the companion modules could be performed via immediate switching to UPS power for the modules. The present invention eliminates the need for the UPS unit, thereby reducing cost, improving reliability and reducing complexity of a UPS powered controller to message/configure the companion modules upon main power loss (thus avoiding the local power source having an overload condition and down time upon main power loss) by allowing performance of the load adjustments while the ATS transfers power supplied from the local power source (e.g., during the transfer time).

The embodiments described herein are directed to a technique for microgrid switchover using zero cross detection that prevents overload when eventually switching to a secondary (local) power source while reducing a power outage during the switchover thereby obviating reliance on a separate controller to direct the microgrid or need for a UPS. Each companion module 200 senses power provided to a load to identify zero-crossings. When a preconfigured number of consecutive missed zero-crossings is detected, the companion module is alerted as to potential main power loss (e.g., unstable power from public utility grid 140) and thus transitions to a virtual critical load (vCL) mode for load adjustment prior to operation under the local power source 102 (e.g., a microgrid). That is, the (breaker) controller 204 of the companion module configured to control power to each branch circuit separately detects the number of missed zero-crossings indicating a loss of utility power and, accordingly, transitions to a virtual critical load mode, which immediately adjusts for a reduced power to avoid overload of the local source. Upon detection of main power loss, the companion module is configured for load activation (or deactivation) via states of one or more vCL bits 250 that, e.g., configure each load for either ON or OFF state when operating under local power. According to the technique, the PBC 108 initially configures (sets) the states of the vCL bits 250 prior to sending the configured vCL bits to the companion modules 200. The vCLP 125 may be thereafter dynamically configurable by a user in real time using the vCL bits 250. Advantageously, the vCL bits of the technique obviate the need for PBC 108 to instruct (e.g., via message exchange) the companion modules 200 to switch (turn on/off) loads in response to main power loss, thereby eliminating time (e.g., seconds) consumed by the message exchange which may result in downtime of the load. Further, a time for the number of missed zero-crossings to occur may be contemporaneous with a transfer time of power supplied from the main power source to power supplied from the local power source so that a downtime is greatly reduced.

The local power source (hereinafter microgrid 102) is configured to quickly detect out-of-bound frequency or voltage levels. Upon detection of an out-of-bound level, a switchover event (e.g., similar to ATS operation) occurs wherein power will "flat-line" for a transfer time, e.g., 70 msecs. This flat-line event functions as a signal sent to the companion modules 200, wherein the modules may detect main power loss based on consecutive missed zero-crossings. In an embodiment, a default number of consecutive, missed zero-crossings may be configured at four (4), although any number of consecutive, missed zero-crossings may be preconfigured (e.g., 2-8 missed zero crossings) to allow adjusting for various ATSs 130. For example, upon detection of 4 consecutive missed zero-crossings, the companion modules 200 may transition to vCL mode and, based on the states of the vCL bits 250 associated with the loads, either activate (maintain) or deactivate (shed) power to each load prior to operation under local power. In response, the relays 210 of the companion modules are instructed to open/close their respective circuit breakers 122, accordingly. When power resumes in 70 msecs, there is no overload on the micro-grid 102.

Essentially, the transfer time represents a "switch-out" time period (e.g., 70 msecs) that is the typical time for an ATS to switchover. The technique described herein ensures that each companion module 200 is powered on (alive) and capable of performing its switchover before expiration of the switch-out time period. Note that the companion modules include sufficient residual energy via one or more capacitors (not shown) to power the breaker controller 204 during the power transfer so that the companion modules can operate during that time period. To that end, the time needed for the companion module 200 to perform its switchover includes (1) the time to detect power loss (e.g., 4 consecutive missed zero-crossings) and (2) the time to instruct the relays 210 to switch on/off their circuit breakers 122. In an embodiment, 4 consecutive missed zero-crossings consume 2.0 cycles of 60 Hz, wherein (i) each zero-crossing is a half cycle, (ii) 1 cycle is 16 msecs, and (iii) each zero-crossing is 8 msecs. Thus, the time to detect power loss is 32 msecs and the time to instruct the relays must take, at most, 70 msec−32 msec=38 msec.

If switchover exceeds 70 msecs, the companion modules 200 lose power (i.e., power in the capacitors drains voltage below a sufficient level) and their relays/circuits automatically open. Thereafter during reboot/reset, the companion modules examine their vCL bits and know the states of their respective loads. Notably, the companion modules 200 "boot" assuming they are in critical (power) mode; the PBC 108 then informs the modules when they should assume operation in normal mode (i.e., similar to initial configuration mode during installation) because the PBC has access to information about the main public utility grid power (e.g., via grid VT signaling). For example, if the load is enabled to be in the vCLP 125, the companion module 200 assumes that the load should be ON. If the normal state of the load is OFF, the PBC 108 will thereafter instruct the module to turn the load off. Note that there are two aspects of being in an ON state: (i) the load is listed in the vCLP 125 and (ii) the user has turned the load ON via the vCL bit.

When in critical mode, a load can only be turned ON if it has an associated vCL bit 250. In an embodiment, the user can turn ON the vCL bit to activate the load, if desired, from the mobile application. According to the technique, the vCL bits 250 are used to mask loads that were turned ON during normal operation to essentially filter out those loads that the user does not want on when operating on local power. Illustratively, the vCL bits 250 function to mask the ON/OFF states of the loads.

In sum, companion modules 200 "self-determine" to transition (enter) into critical mode quickly to avoid tripping breakers in local power sources (e.g., batteries/generators) if the battery power is exceeded. By entering critical mode quickly, the companion modules may shed extra loads quickly to avoid overloading the local power source 102. Notably, transitioning of companion modules to critical mode should occur before the switchover to the local power source. To that end, the companion modules are configured to shed the extra loads before the switchover to local power.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly, this description is to be taken only by way of example and not to otherwise limit the scope of the invention. It is thus the object of the appended claims to cover all such variations and modifications as come within the true spirit and scope of the invention.

What is claimed is:

1. An apparatus comprising:
   an automated transfer switch (ATS) configured to disconnect primary electrical power from a primary electrical power source and supply secondary electrical power from a secondary electrical power source when the primary electrical power fails; and
   one or more companion modules installed in a load center and connected to the secondary electrical power source through the ATS, each companion module controlling electrical power to a respective branch circuit of the load center and including a zero-cross detector for voltage on the respective branch circuit, each companion module including a processor and a memory connected to the respective zero-cross detector, wherein the processor is configured to,
      in response to detecting a preconfigured number of consecutive missed zero-crossings from the failed primary electrical power, set a state of supplying the electrical power to the respective branch circuit based on information stored in the memory when the secondary electrical power is supplied from the secondary electrical power source.

2. The apparatus of claim 1, wherein each companion module further includes a capacitor to power the respective processor during a transfer time of supplying the primary electrical power from the primary electrical power source to supplying the secondary electrical power from the secondary electrical power source.

3. The apparatus of claim 1, wherein the setting of the state of supplying the electrical power to the respective branch circuit occurs during a transfer time of supplying the primary electrical power from the primary electrical power source to supplying the secondary electrical power from the secondary electrical power source.

4. The apparatus of claim 1, wherein the preconfigured number of consecutive missed zero-crossings has a default value of 4.

5. The apparatus of claim 1, wherein the information stored in the memory to set the state of the supplying electrical power to the respective branch circuit has a default state to turn power off to the respective branch circuit.

6. The apparatus of claim 1, wherein the information stored in the memory to set the state of the supplying electrical power to the respective branch circuit is used to mask a prior state of supplying electrical power to the respective branch circuit during the primary electrical power being supplied from the primary electrical power source to filter out activation of loads when operating on the secondary electrical power.

7. The apparatus of claim 1, wherein the information stored in the memory to set the state of the supplying electrical power to the respective branch circuit is configured using a mobile application for critical loads.

8. The apparatus of claim 1, wherein the information stored in the memory to set the state of the supplying electrical power to the respective branch circuit comprises a mask to filter the state of supplying electrical power to the respective branch circuit and a critical load panel state to set the state of supplying electrical power to the respective branch circuit when the secondary electrical power is supplied from the secondary electrical power source.

9. The apparatus of claim 1, wherein the processor of each companion module is configured to turn off supply of power to the respective branch circuit after booting.

10. The apparatus of claim 1 wherein the processor of each companion module remains powered during a transfer time of supplying the primary electrical power from the primary electrical power source to supplying the secondary electrical power from the secondary electrical power source.

11. A non-transitory computer readable medium having program instructions executable on a processor of a companion module installed in a load center, wherein the companion module controls electrical power to a branch circuit of the load center supplied according to an automated transfer switch for transferring primary electrical power supplied from a primary electrical power source to secondary electrical power supplied from a secondary electrical power source when the primary electrical power fails, wherein the companion module includes a zero-cross detector for voltage on the branch circuit, the program instructions configured to,
   in response to detecting a preconfigured number of consecutive missed zero-crossings, set a state of supplying the electrical power to the branch circuit based on information stored in the memory when secondary electrical power is supplied from the secondary electrical power source.

12. The non-transitory computer readable medium of claim 11, wherein the setting of the state of the supplying the electrical power to the branch circuit occurs during a transfer time of supplying the primary electrical power from the primary electrical power source to supplying the secondary electrical power from the secondary electrical power source.

13. The non-transitory computer readable medium of claim 11, wherein the preconfigured number of consecutive missed zero-crossings has a default value of 4.

14. The non-transitory computer readable medium of claim 11, wherein the information stored in the memory to set the state of the supplying electrical power to the branch circuit has a default state to turn power off to the branch circuit.

15. The non-transitory computer readable medium of claim 11, wherein the information stored in the memory to set the state of the supplying electrical power to the branch circuit is used to mask a prior state of supplying electrical power to the branch circuit during the primary electrical power being supplied from the primary electrical power source to filter out activation of loads when operating on the secondary electrical power.

16. The non-transitory computer readable medium of claim 11, wherein the information stored in the memory to set the state of the supplying electrical power to the branch circuit comprises a mask to filter the state of supplying electrical power to the branch circuit and a critical load panel state to set the state of supplying electrical power to the branch circuit when power is supplied from the secondary electrical power source.

17. The non-transitory computer readable medium of claim 11, wherein the program instructions are further configured to turn off supply of power to the branch circuit after booting.

18. A method of controlling electrical power to branch circuits of a load panel, each branch circuit controlled by a companion module installed in the load panel during transfer of supplying primary electrical power from a primary electrical power source to supplying secondary electrical power from a secondary electrical power source when the primary electrical power fails, comprising:

in response to detecting a preconfigured number of consecutive missed zero-crossings of an AC voltage at each branch circuit, setting a state of supplying the electrical power to a respective branch circuit based on information stored in a memory of each companion module during a transfer time of supplying the primary electrical power from the primary electrical power source to supplying the secondary electrical power from the secondary electrical power source.

19. The method of claim 18, wherein setting the state of supplying electrical power to the respective branch circuit further comprises:

applying the information stored in the memory of a respective companion module as a mask to filter a prior state of supplying the electrical power to the respective branch circuit during the primary electrical power being supplied from the primary electrical power source.

20. The method of claim 18 further comprising turning off supply of power to the respective branch circuit after the respective companion module boots.

\* \* \* \* \*